(12) United States Patent
Crossman et al.

(10) Patent No.: US 8,329,622 B2
(45) Date of Patent: Dec. 11, 2012

(54) ALCOHOL COMPATIBLE COPOLYMER

(75) Inventors: Martin Crossman, Hixson, TN (US); Stuart Holt, Luzern (CH); Jannifer Sanders, Hixson, TN (US)

(73) Assignee: Akzo Nobel N.V., Arnhem (NL)

( * ) Notice: Subject to any disclaimer, the term of this patent is extended or adjusted under 35 U.S.C. 154(b) by 570 days.

(21) Appl. No.: 11/123,907

(22) Filed: May 6, 2005

(65) Prior Publication Data
US 2006/0252653 A1    Nov. 9, 2006

(51) Int. Cl.
  *C09K 8/588*  (2006.01)
(52) U.S. Cl. .......................................... 507/221; 526/72
(58) Field of Classification Search .................. 507/221; 526/72
  See application file for complete search history.

(56) References Cited

U.S. PATENT DOCUMENTS

| | | | |
|---|---|---|---|
| 2,892,816 A | | 6/1959 | Warren Lowe et al. |
| 3,968,310 A | * | 7/1976 | Stowell ...................... 428/411.1 |
| 4,566,973 A | * | 1/1986 | Masler et al. .................. 210/701 |
| 4,647,396 A | * | 3/1987 | Denzinger et al. ........... 510/476 |
| 4,937,002 A | * | 6/1990 | Bainbridge et al. .......... 210/701 |
| 5,263,539 A | * | 11/1993 | Salimi et al. .................. 166/279 |
| 5,278,227 A | | 1/1994 | Bernard |

FOREIGN PATENT DOCUMENTS

| | | |
|---|---|---|
| EP | 032041 | 7/1981 |
| EP | 0032041 A2 * | 7/1981 |
| EP | 0168547 A2 * | 1/1986 |
| FR | 2340337 A * | 10/1977 |

OTHER PUBLICATIONS

PA. Lovell and M.S. El-Aasser Eds., Emulsion Polymerization and Emulsion Polymers, John Wiley & Sons, pp. 624, 626 (1997).
European Patent Office Action dated Aug. 3, 2009.

* cited by examiner

*Primary Examiner* — Alicia Toscano
(74) *Attorney, Agent, or Firm* — Norris McLaughlin & Marcus PA

(57) ABSTRACT

Alcohol compatible, water-soluble copolymer useful as a corrosion inhibitor. The copolymer includes at least one olefinically unsaturated carboxylic acid monomer, at least one olefinically unsaturated mono- or di-alkyl ester of a di-carboxylic acid monomer, and at least one olefinically unsaturated hydrophilic, non-ionic monomer. The molar ratio of the alkyl ester groups of the mono- or di-alkyl ester of the dicarboxylic acid monomer to the hydrophilic groups of the hydrophilic, non-ionic monomers is from about 0.01:1 to 1000:1, and the molar ratio of the sum of the alkyl ester groups and hydrophilic groups of the hydrophilic, non-ionic monomers to the carboxylic acid groups, is from about 0.001:1 to 100:1. No haze or precipitate occurs in a mixture of the water-soluble copolymer at 4° C. for 15 hrs or more as a 20 weight % aqueous copolymer solution in alcohol at a water-soluble copolymer to methanol weight-ratio of not more than 25 to 100.

29 Claims, No Drawings

ALCOHOL COMPATIBLE COPOLYMER

BACKGROUND OF THE INVENTION

1. Technical Field

The present invention is directed towards a copolymer for use in scale inhibition. More specifically, the present invention discloses an alcohol compatible, water-soluble copolymer that is useful as a corrosion inhibitor.

2. Background Information

In the offshore oil drilling industry umbilical lines are used to transport a variety of fluids over great distances, often tens of kilometers in length. These umbilical lines can consist of several independent lines depending on the type of fluid transported to the reservoir. For example, the fluids can be water-based scale inhibitors used to prevent solid salt formation in the well. Other types of fluid transported include alcohols such as methanol, which can be used to prevent formation of water/methane ice structures downhole. These ice structures can form in the presence of natural gas causing significant problems.

Often the number of fluids transported exceeds the number of umbilical lines available. This can occur, for example, due to a blocked line or the requirement for additional fluid(s) to be transported to the reservoir. Therefore, there is a strong need to be able to combine one or more of the fluids with others in order to address this line constraint. However, a problem can occurs in trying to combine the materials in that they are often not compatible with each other. For example, one of the materials may be water based and not compatible with alcohols transported through the lines, such as methanol. Therefore, there is a need for alcohol compatibility between the chemicals. Further, it would be beneficial if that alcohol compatible chemical also functioned as a scale inhibitor. Such compatibility is very beneficial when an alcohol such as methanol diffuses through the wall of its line into another line transporting the water based copolymer, thus avoiding any precipitation that would occur due to incompatibility of the copolymer with the alcohol. Finally, the alcohol compatible chemical should ideally be at least partially biodegradable.

U.S. Pat. No. 4,937,002 describes a method for inhibiting precipitation of barium sulfate and other insoluble sulfates in aqueous injection or produced fluids having a pH of 7 or less, and is most effective in aqueous fluids having a pH of about 4 to about 7. The aqueous fluid is dosed with 1 to 500 ppm of an interpolymer consisting essentially of about 25 to 90 mole % of an ethylenically polymerizable carboxylic acid and 10 to 75 mole % of at least one copolymerizable comonomer. Exemplified are interpolymers formed from (1) acrylic acid, maleic acid (maleic anhydride) and hydroxypropyl acrylate, (2) acrylic acid and mono-methyl maleate, and (3) acrylic acid and maleic acid (maleic anhydride). These interpolymers have molecular weights of from 500 to 10,000. Compatibility with alcohol, particularly methanol, is not described.

SUMMARY OF THE INVENTION

As a solution to the above described issue, the present invention provides a water-soluble copolymer having excellent scale inhibitor properties. This copolymer is also compatible with other fluids such as alcohol, for example, methanol. The copolymer can be compatible with the other fluid component at low temperatures (e.g., −50° C. or less), even at very low copolymer and water concentrations.

In one aspect the copolymer is miscible with another fluid component such as methanol thereby providing worry-free (precipitant free) injection down a methanol containing umbilical line. In another aspect the copolymer is miscible with an alcohol such as methanol, thereby enabling direct injection of the copolymer into mono-ethylene glycol/methanol recycle lines for hydrate-forming gas fields. When transported through a secondary line, alcohol compatibility is desirable since the copolymer can be contaminated with methanol via diffusion through the tube matrix. Furthermore, standards set by the Organization for Economic Cooperation and Development ('OECD') require biodegradability of the copolymer of at least 20%, as well as high flexibility in product optimization for different application requirements. These include applications such as copolymer optimization for $BaSO_4$ and/or $CaCO_3$ inhibition in, for example, the oil field industry, as well as optionally for good brine tolerance. In one aspect the polymer can be produced with standard, well-optimized processes and techniques. In another aspect the solids content of the aqueous polymer is in a standard range, such as 20 to 60 weight % or higher, in order to optimize freight storage costs. The pH of the aqueous copolymer solution is not subject to specific criteria; however, in one aspect it is within a pH range that provides it with a non-corrosive liquid status for shipment purposes (e.g., above pH 2).

Accordingly, the present invention is directed towards a water-soluble copolymer which is alcohol compatible. The copolymer is formed from the polymerization of at least one or more olefinically unsaturated carboxylic acid monomers, at least one or more olefinically unsaturated mono- or di-alkyl esters of a di-carboxylic acid monomer and at least one or more olefinically unsaturated hydrophilic, non-ionic monomers. The copolymer can also be formed from further optional copolymerizable monomers.

In one embodiment the molar ratio of the alkyl ester groups of the mono- or di-alkyl esters of the dicarboxylic acid monomer to the hydrophilic groups of the hydrophilic, non-ionic monomers is from about 0.01:1 to 1000:1. Further, the molar ratio of the sum of the alkyl ester groups and hydrophilic groups of the hydrophilic, non-ionic monomers to the carboxylic acid groups is from about 0.001:1 to 100:1. Preferably, no haze or precipitate occurs at 4° C. for 15 hrs or more of a mixture of water soluble copolymer as a 20 weight % aqueous copolymer solution in methanol at a water-soluble copolymer to methanol weight-ratio of not more than 25 to 100. In another aspect, no haze or precipitate occurs in a weight ratio of not more than 10 to 100.

Accordingly, the present invention is directed towards a water-soluble copolymer having at least one olefinically unsaturated carboxylic acid monomer, at least one olefinically unsaturated mono- or di-alkyl ester of a dicarboxylic acid monomer, and at least one olefinically unsaturated hydrophilic, non-ionic monomer. The molar ratio of the alkyl ester groups of the mono- or di-alkyl ester of the dicarboxylic acid monomer or constituent of the copolymer to the hydrophilic groups of the hydrophilic, non-ionic monomer or constituent of the copolymer is from about 0.01:1 to 1000:1, and the molar ratio of the sum of the alkyl ester groups and hydrophilic groups of the hydrophilic, non-ionic monomers to the carboxylic acid groups, is from about 0.001:1 to 100:1. The water soluble copolymer is also alcohol compatible.

Preferably, no haze or precipitate occurs at 4° C. for 15 hrs or more in a mixture of the water-soluble copolymer as a 20 weight % aqueous copolymer solution in methanol at a water-soluble copolymer to methanol weight ratio of not more than about 25 to 100.

The olefinically unsaturated carboxylic acid monomer or constituent of the copolymer can include at least one mono-carboxylic acid monomer, at least one dicarboxylic acid monomer, at least one mono-ester of a dicarboxylic acid monomer, at least one di-ester of a dicarboxylic acid monomer, or combinations thereof. In even a further aspect, examples of monocarboxylic acid monomers of the olefinically unsaturated carboxylic acid monomer include acrylic acid, methacrylic acid and combinations thereof. Examples of dicarboxylic acid monomers of the olefinically unsaturated carboxylic acid monomer include maleic acid, fumaric acid, itaconic acid and combinations thereof. Examples of suitable mono-esters of a dicarboxylic acid monomer of the olefinically unsaturated carboxylic acid monomer include the mono-alkyl ester of maleic acid, fumaric acid, itaconic acid, and combinations thereof.

Examples of olefinically unsaturated mono- or di-alkyl esters of the dicarboxylic acid monomer or constituent include alkyl groups having $C_1$ to $C_{20}$ hydrocarbons, polyalkoxys, polyalkylene glycol groups, or combinations thereof. In even a further aspect, examples of suitable alkyl groups of the olefinically unsaturated mono- or di-alkyl ester of a dicarboxylic acid monomer include $C_1$ to $C_8$ hydrocarbon groups; polyalkoxy groups such as polyethoxy groups, polypropoxy groups, block copolymers of polyethoxy and polypropoxy groups, or combinations thereof. Further, suitable polyalkylene glycol groups include polyethylene glycol groups, polypropylene glycol groups, block copolymers of polyethylene glycol and polypropylene glycol groups, or combinations thereof.

The di-alkyl ester of the dicarboxylic acid monomer or constituent of the copolymer can include only one type of alkyl group or two or more different types of alkyl groups.

Examples of useful olefinically unsaturated hydrophilic, non-ionic monomers of the copolymer include vinyl and/or allyl alcohols, vinyl and/or allyl amines, (meth)acrylic acid alkyl esters, mono- or di-alkyl esters of a dicarboxylic acid monomer, N-(di)alkyl(meth)acrylamides, or combinations thereof. The alkyl group can be an hydroxy and/or amine containing $C_1$ to $C_8$ alkyl group. In one aspect, when the olefinically unsaturated hydrophilic, non-ionic monomer is at least a (meth)acrylic acid alkyl ester, the alkyl group can be an hydroxy and/or amine containing $C_1$ to $C_4$ alkyl group. For example, the (meth)acrylic acid alkyl ester can be hydroxyethyl and/or hydroxypropyl (meth)acrylate.

In another aspect the olefinically unsaturated hydrophilic, non-ionic monomer of the present invention water-soluble copolymer has water solubility at 20° C. of 5 g per liter or more.

The water-soluble copolymer can further optionally include copolymerizable monomers such as sulfur, phosphorous, chlorine, nitrogen and/or silicon containing monomers, styrene and derivatives thereof, vinyl acetate, or combinations thereof. In one aspect, these optional copolymerizable monomers are added from about 0.01 to 50 mol percent per 100 mol copolymerized monomers.

Preferably, the molar ratio of the alkyl ester groups of the mono- or di-alkyl ester of the dicarboxylic acid monomer of the water-soluble copolymer to the hydrophilic groups of the hydrophilic, nonionic monomer is from about 0.05:1 to 500:1. Further, the molar ratio of the sum of the alkyl ester groups and hydrophilic groups of the hydrophilic, non-ionic monomers of the water-soluble copolymer to the sum of the carboxylic acid groups is preferably from about 0.01:1 to 10:1.

In one aspect the water-soluble copolymer is compatible with an alcohol that is a $C_1$ to $C_6$ alcohol with one or more hydroxy groups. Examples of such alcohols include methanol, ethanol, propanol, butanol, ethylene glycol, propylene glycol, glycerol or combinations thereof.

In another aspect, the water-soluble copolymer is un-neutralized or at least partly neutralized, and the neutralizing agent is a nitrogen containing base.

In one embodiment, the water-soluble copolymer is compatible with corrosion inhibitors. In another embodiment, the water-soluble copolymer can have a biodegradability of about 10% or more measured according to OECD standards.

The present invention is also directed towards a method of producing the above described water-soluble copolymer by copolymerizing the monomers by radical solution copolymerization at temperatures of about 20 to 120° C. in water and/or in a homogeneous water-organic solvent mixture. The present invention further provides a method of inhibiting scale in oil extraction and oil production involving applying the above described water-soluble copolymer to an oilfield reservoir, including the production from such reservoir.

DETAILED DESCRIPTION OF THE INVENTION

The present invention is directed towards a copolymer that is both water soluble and alcohol compatible. The copolymer is formed from the polymerization of at least one or more olefinically unsaturated carboxylic acid monomers, at least one or more olefinically unsaturated mono- or di-alkyl esters of a di-carboxylic acid monomer, and at least one or more olefinically unsaturated hydrophilic, non-ionic monomers. The copolymer can also be formed from further optional copolymerizable monomers.

Alkyl groups of the olefinically unsaturated mono- or di-alkyl esters of a dicarboxylic acid monomer or their amide equivalents include in one embodiment a linear or branched $C_1$ to $C_{20}$ hydrocarbon. In another embodiment the alkyl group is a linear or branched $C_1$-$C_8$ hydrocarbon. In even another embodiment the alkyl group is a linear or branched $C_1$-$C_4$ hydrocarbon group. Alkyl groups can be just one type of alkyl group or a mixture of two or more different alkyl groups. Non-limiting examples include methyl, ethyl, n-propyl, i-propyl, n-butyl, i-butyl-, t-butyl, hexyl, cyclohexyl, 2-ethylhexyl, lauryl, stearyl and norbornyl. In one aspect the alkyl groups are methyl, ethyl, butyl and/or 2-ethylhexyl groups. In another aspect the alkyl groups are mono- and/or di-alkyl esters of itaconic acid, mono- and/or di-alkyl esters of maleic acid, mono- and/or di-alkyl esters of citraconic acid, mono- and/or di-alkyl esters of mesaconic acid, mono- and/or di-alkyl esters of glutaconic acid, and/or mono- and/or di-alkyl esters of fumaric acid, mono- and/or di-alkyl maleamides, and/or the reaction product of an alkyl amine with maleic anhydride or itaconic anhydride. In an even further aspect the alkyl groups are mono-methyl maleate, di-methyl maleate, mono-ethyl maleate and/or di-ethyl maleate.

In another embodiment, alkyl groups of the olefinically unsaturated mono- and/or di-alkyl esters of a dicarboxylic acid monomer can be a polyalkoxy group having 2 or more alkoxy units and/or a polyalkylene glycol group having 2 or more alkylene glycol units. Di-alkyl esters of the dicarboxylic acid monomer can have just one type of alkyl group or they can have two or more different types of alkyl groups. Exemplary alkylene glycol units include hydroxy terminating groups such as methoxy and/or ethoxy. Other examples include one or more polyalkoxy groups such as polyethoxy, polypropoxy and/or a block copolymer of polyethoxy and polypropoxy. Exemplary polyalkylene glycol groups include polyethylene glycol, polypropylene glycol and/or block copolymers of polyethylene glycol and polypropylene glycol.

It is also possible that the alcohol compatible, water soluble copolymer contains alkyl-groups of both the hydrocarbon embodiment and the polyalkoxy and/or polyalkylene glycol embodiment.

The dicarboxylic acid monomers are water soluble at about 20° C. in an amount of about 0.5 g or more of monomer per liter of water. In another aspect the dicarboxylic acid monomers are water soluble at 20° C. in an amount of 1 g or more of monomer per liter. In even another aspect the dicarboxylic acid monomers are water soluble at 20° C. in an amount of 5 g or more of monomer per liter.

Hydrophilic groups include olefinically unsaturated hydrophilic, nonionic monomers having one or more hydrophilic groups. They include hydroxyls, primary, secondary and/or tertiary amines, amides, nitriles, formamides, polyalkylenes such as polyethylene, pyrrolidones, carbamates, imidazoles, and/or glycidyl groups. The latter can also be in its hydrolyzed form. Non-limiting examples of monomers containing such groups include vinyl and/or (meth)allyl alcohols that can be polymerized as is or as vinyl acetate and/or allyl acetate and subsequently hydrolyzed (e.g., vinyl and/or allyl amines). Other examples include (meth)acrylic acid alkyl esters, mono- or di-alkyl esters of a dicarboxylic acid monomer, and/or N-(di)alkyl (meth)acrylamide, wherein the alkyl group is a hydroxy- and/ or amine-containing $C_1$ to $C_8$ alkyl group; (meth)acrylamide and/or N-(di)alkyl (meth)acrylamide with one or more of the same or differing $C_1$ to $C_3$ alkyl groups; hydroxy methyl (meth)acrylate, hydroxy ethyl (meth)acrylate, hydroxypropyl (meth)acrylate, hydroxy butyl (meth)acrylate, glycidyl methacrylate and its hydrolyzed form, dialkyl aminomethyl (meth)acrylate, dialkyl aminoethyl (meth)acrylate and/or dialkylaminopropyl (meth)acrylamide with $C_1$ to $C_4$ alkyl groups, vinyl formamide, vinyl acetamide; polyethylene glycol esters of acrylic acid, methacrylic acid, maleic acid and/or itaconic acid; alkyl ethylene glycol esters of acrylic acid, methacrylic acid, maleic acid and/or itaconic acid; vinyl pyrrolidone, vinyl imidazole, vinyl alcohol (hydrolyzed vinyl acetate), (meth)allyl alcohol, glycidyl allyl ether, propanediol allyl ether, allyl glycol ethers, hydroxyalkyl (meth)acrylamides, bis-hydroxyalkyl (meth)acrylamides, N-[3-(dimethyl amino)-propyl](meth)acrylamide, N-[3-(dimethyl amino)ethyl](meth)acrylate, N-methylol (meth)acrylamide, and/or N-methylol allyl carbamate. Combinations of ethylenically unsaturated hydrophilic monomers can also be used. While di-alkyl esters of dicarboxylic acid monomers are preferred over mono-alkyl esters, it is also possible to use mono-alkyl esters of dicarboxylic acid monomers (e.g., at low pH conditions) since the carboxylic acid monomer remains protonated. Useful olefinically unsaturated hydrophilic, non-ionic monomers include hydroxy and/or amine containing $C_1$ to $C_4$ (meth)acrylates such as hydroxyethyl and/or hydroxypropyl (meth)acrylate.

In one embodiment the olefinically unsaturated hydrophilic, non-ionic monomer is a non-ionic monomer with water solubility higher than other non-ionic monomers. In one aspect the water solubility at 20° C. is about 1.8 g monomer per liter water or more. In another aspect the water solubility at 20° C. is about 5 g monomer per liter or more. In even another aspect the water solubility at 20° C. is about 10 g monomer per liter or more.

TABLE 1

Water solubility of selected monomers*

| Monomer | Water solubility (g monomer/100 g water) |
|---|---|
| 2-Hydroxyethyl acrylate | Indefinite |
| 2-Hydroxyethyl methacrylate | Indefinite |
| 2-Hydroxypropyl acrylate | Indefinite |
| 2-Hydroxypropylmethacrylate | 13.0 |
| Acrylamide | 215.5 |
| Acrylonitrile | 7.9 |
| Butylacrylate | 0.2 |
| t-Butyl aminoethylmethacrylate | 1.8 |
| Methyl acrylate | 5.2 |
| Methylmethacrylate | 1.59 |
| N,N-dimethyl aminoethylmethacrylate | Indefinite |
| Styrene | 0.032 |
| Vinyl acetate | 0.9 |

*From Emulsion Polymerization and Emulsion Polymers, P.A. Lovell and M.S. El-Aasser Eds., John Wiley & Sons, pp. 624, 626 (1997).

Carboxylic acid groups include olefinically unsaturated mono-, di- or tri-carboxylic acid monomers and/or a mono-ester of a di-carboxylic acid monomer, and are subject to deprotonation upon pH increase. The olefinically unsaturated carboxylic acid monomer can be any monomer with one or more carboxylic acid groups capable of undergoing radical polymerization. In one aspect the monomers are mono-unsaturated.

Non-limiting examples of ethylenically unsaturated mono-carboxylic acid monomers include acrylic acid, methacrylic acid, ethacrylic acid, α-chloro-acrylic acid, α-cyano acrylic acid, β-methyl-acrylic acid (crotonic acid), α-phenyl acrylic acid, α-acryloxy propionic acid, sorbic acid, α-chloro sorbic acid, methacryloxyethyl succinic acid, angelic acid, cinnamic acid, p-chloro cinnamic acid, β-styryl acrylic acid (1-carboxy-4-phenyl butadiene-1,3), vinyl ester of benzoic acid and p-tert-butyl benzoic acid and 2-acryloxypropionic acid.

Non-limiting examples of ethylenically unsaturated di-carboxylic acid monomers include itaconic acid, maleic acid, citraconic acid, mesaconic acid, glutaconic acid, fumaric acid and maleic anhydride, which will rapidly hydrolyze to maleic acid under polymerization conditions.

Non-limiting examples of ethylenically unsaturated tri-carboxylic acid monomers include aconitic acid and tricarboxy ethylene.

Non-limiting examples of ethylenically unsaturated mono-esters of a di-carboxylic acid monomer include mono-alkyl esters of itaconic acid, maleic acid, citraconic acid, mesaconic acid, glutaconic acid, aconitic acid, fumaric acid, tricarboxy ethylene.

Non-limiting examples of ethylenically unsaturated mono- or di-esters of a tri-carboxylic acid monomer include mono-alkyl esters aconitic acid and tricarboxy ethylene.

It is also possible to select mixtures of any of the carboxylic acid monomers. In one embodiment the mono-carboxylic acid monomer is acrylic acid and/or methacrylic acid, the di-carboxylic acid monomer is maleic acid, fumaric acid and/or itaconic acid, the mono-ester of a di-carboxylic acid monomer is the mono-alkyl ester of maleic acid, fumaric acid, and/or itaconic acid, and mixtures thereof. In another embodiment, acrylic acid, methacrylic acid, maleic acid and/or itaconic acid make up the olefinically unsaturated carboxylic acid monomer.

The water-soluble polymer according to the present invention is alcohol compatible when certain molar ratios of the alkyl-groups to hydrophilic-groups (Ratio I) and the molar ratios of the sum of the alkyl- and hydrophilic-groups to the acid-groups (Ratio II) are within a certain range as defined below—

$$\text{Ratio } I = \frac{A}{H}; \text{Ratio } II = \frac{A+H}{C}$$

wherein
"A" represents the sum of alkyl groups of the alkyl ester groups of dicarboxylic acid monomers in mol %
"H" represents the sum of the hydrophilic groups of the non-ionic monomers in mol %
"C" represents the sum of carboxylic acid groups in mol %

One ethylenically unsaturated monomer can have two or more groups, which can be the same or different. For example, a dicarboxylic acid monomer such as maleic acid or itaconic acid has two carboxylic acid groups, and a monoalkyl ester of a di-carboxylic acid monomer has one alkyl group as well as one carboxylic acid group. The alkyl group(s) can also be hydroxyl and/or amine functionalized, thus being a hydrophilic group.

In one aspect the range for Ratio I is from about 0.01:1 to 1000:1. In another aspect the range is from about 0.05:1 to 500:1. In even another aspect the Ratio I range is from about 0.1:1 to 100:1; more particularly from about 0.5:1 to 50:1.

In one aspect the range for Ratio II is from about 0.001:1 to 100:1. In another aspect the Ratio II range is from about 0.01:1 to 10:1; more particularly from about 0.05:1 to 1:1.

Optionally, further olefinically unsaturated monomers can be copolymerized. They include any copolymerizable monomers such as sulfur, phosphorous, chlorine, nitrogen and/or silicon containing monomers, styrene and its derivatives, and/or vinyl acetate. Non-limiting examples of sulfur containing monomers include sulfonate polymers formed from at least one unsaturated sulfonic acid monomer, for example, (meth) acrylamido methyl propane sulfonic acid, styrene sulfonic acid, vinyl sulfonic acid, 3-sulfopropyl (meth)acrylate, (meth)allyl sulfonic acids, (meth)allyloxy benzene sulfonic acids, and/or allyloxy hydroxyalkyl sulfonic acids. In one embodiment the sulfur containing monomers are vinyl sulfonic acid and/or 2-acrylamido-2-methylpropane sulfonic acid ('AMPS').

Non-limiting examples of phosphorus containing monomers include vinyl phosphonic acid, hydroxy ethyl (meth) acrylate phosphate, hydroxy propyl (meth)acrylate phosphate and/or hydroxy butyl (meth)acryate phosphate.

Non-limiting examples of nitrogen containing monomers include acrylamido glycolic acid, diacetonacrylamide, N-[3-(trimethyl ammonium)propyl]methacrylamide chloride, and/or N,N-[3-chloro-2-hydroxypropyl)-3-dimethylammoniumpropyl](meth)acrylamide chloride.

Non-limiting examples of silicon containing monomers include (meth)acryloxyalkyl tri(alkoxy)silane, vinyl trialkoxy silane, vinyl alkyl dialkoxy silane, and/or trialkyl silyl (meth)acrylate, wherein the alkoxy-groups are, for example, methoxy-, ethoxy- and/or iso-propoxy-groups and the alkyl-groups are, for example, methyl-, ethyl- and/ or isopropyl-groups.

Further optional monomers include various linear and branched $C_1$ to $C_{18}$ (meth)acrylates and $C_1$ to $C_{18}$ vinyl monomers. Non-limiting examples include methyl (meth)acrylate, ethyl (meth)acrylate, n-butyl (meth)acrylate, t-butyl (meth) acrylate, 2-ethylhexyl (meth)acrylate, tetrahydrofuryl (meth) acrylate, acetylacetoxyethyl (meth)acrylate, vinyl acetate, vinyl stearate, vinyl formate, vinyl propionate, vinyl butyrate, vinyl pivalate, vinyl laurate, vinyl-2-ethylhexanoate, 1-methylvinylacetate and/or $C_9$, $C_{10}$ and/or $C_{11}$ vinyl versatate. In one embodiment (meth)acrylate and vinyl monomers include methyl (meth)acrylate, ethyl (meth)acrylate and/or vinyl acetate.

The range of optional copolymerizable monomers can be from about 0.01 to 50 mole percent. In another aspect the range can be from about 0.1 to 25 mole percent. In another aspect the range can be from about 1 to 15 mole percent. In even another aspect the range can be from about 2 to 10 mole percent per 100 mole copolymerized monomers.

Alcohol compatibility of water-soluble copolymers depends on time and temperature of exposure, as well as water content and type of alcohol the copolymer is stable with. Alcohol compatibility becomes increasingly difficult as water content decreases. While most formulations defined by the ratio I and II are alcohol compatible, it is possible that some selections do not exhibit good enough alcohol compatibility. Accordingly, an alcohol compatible, water-soluble copolymer according to the present invention does not give any haze or precipitate when mixed as a 20 weight % aqueous copolymer solution in methanol at a weight ratio of the 20 weight % aqueous copolymer solution to methanol of not more than 25 to 100 by visually assessment for at least 15 hours without stirring at 4° C. of a mixture of water-soluble copolymer, preferably of not more than 10 to 100, most preferably of not more than 5 to 100 and in particular of not more than 2 to 100.

The alcohol in which the water-soluble copolymer is compatible in is preferably a $C_1$- to $C_6$-alcohol with one or more hydroxy-groups. Non-limiting examples include methanol, ethanol, n-propanol, i-propanol, n-butanol, i-butanol, t-butanol, ethylene glycol, propylene glycol, $C_2$- to $C_6$-alkyl ether glycols and/or glycerol. In one embodiment the alcohol is methanol, ethanol, ethylene glycol and/or propylene glycol.

The alcohol compatible, water-soluble copolymer can be non-neutralized or slightly neutralized. However, in many cases it is preferred that it is at least partly neutralized. For example, in one embodiment about 10 to 90 mol % of the carboxyl groups of the copolymer are neutralized. In another embodiment about 25 to 70 mol % of the carboxyl groups are neutralized. The alcohol compatible, water-soluble copolymer can also be fully neutralized (i.e., above 90 mol %) if an alkaline environment is required. Neutralizing agents can be any at least partially water-soluble bases. In one aspect the agents are salts of alkaline metals such as lithium, sodium and/or potassium; alkaline earth metals such as calcium, and/or magnesium; nitrogen containing bases such as ammonia; and/or organic bases such as triethanolamine or mono-, di- or tri-alkyl amines. In another aspect the neutralizing agents are nitrogen containing bases such as ammonia and/or triethanolamine. Thus, the pH of the alcohol compatible, water-soluble copolymer at 30% solids in water can range from about 1 to 12, preferably from about 2 to 9 and in particular from about 2 to 7.

In one embodiment the alcohol compatible, water-soluble copolymer can also be used as a scale inhibitor. The copolymer can be easily adjusted to specific application requirements by varying within the inventive embodiment the type and ratio of monomers used. For example, the composition can be optimized for excellent $CaCO_3$ or $BaSO_4$ inhibition or even both.

In the offshore oil drilling industry environmental aspects, in addition to economical aspects, are becoming increasingly important. Thus, it is desirable that the products are at least partially biodegradable. Preferably the copolymers have a degree of biodegradability of about 10% or more measured according to OECD standards. In another aspect the copolymers have a degree of biodegradability of about 20% or more. In even another aspect the copolymers have a degree of biodegradability of about 30% or more.

Under common subsea and/or deepwater crude oil production conditions gas hydrate formation is a real problem. Gas hydrates are a form of water ice stabilized by inclusion of dissolved gas molecules at temperatures up to 20° C. under high pressure conditions, or due to Joule Thompson cooling. The gas hydrate causes restriction and plugging of oil extraction operations. The most common and cheapest treatment for hydrates is using thermodynamic hydrate inhibitors such as methanol (continuous injection through umbilical) or recyclable MEG systems which reduce the temperature of hydrate formation to below that of operating conditions. Both treatment regimes represent considerable initial capital expenditure and maintenance costs. A scale inhibitor that can be injected concurrently with either of these two thermodynamic hydrate inhibitors provides operators valuable flexibility in their chemical injection regimes at no extra capital cost, or can reduce capital costs if specified in the early stages of asset design.

In one embodiment the alcohol compatible, water-soluble copolymer is compatible with corrosion inhibitors, thus allowing the combination of corrosion inhibitor with scale inhibitor in one umbilical line. When optimized for this requirement, this combination can also be alcohol compatible, thereby enabling the mixture to be further combined with an umbilical line containing an alcohol such as methanol.

The alcohol compatible, water-soluble copolymer can be manufactured by radical solution polymerization at temperatures between about 20 and 120° C. In one embodiment the copolymer is polymerized at temperatures between about 50 and 100° C. The continuous phase can be water, but it can be also a homogeneous water-organic solvent mixture and/or an organic phase only consisting of one solvent or more solvents. When an organic solvent is used with or without water, the organic solvent can be a $C_1$ to $C_8$ alcohol or mixture thereof. Examples of suitable solvents include methanol, ethanol, and/or isopropanol. The copolymer can be manufactured using batch, semi-batch and/or continuous processes.

The copolymer can be made using any radical-forming initiator systems such as thermal initiator systems. These include persulfates such as potassium, sodium and/or ammonium persulfate; azo-initiators such as azobisisobutyronitrile, azobiscyanovaleriane acid and 2,2'-azobis(2-methylpropionamidin)dihydrochloride; redox initiator systems including oxidizers such as hydrogen peroxide, t-butyl hydroxide, t-butyl peroxide, cumol hydroperoxide, t-butyl peroxopivalate, isopropyl benzomonohydroperoxide, dibenzoyl peroxide, bicyclohexylperoxydicarbonate and dicetylperoxydicarbonate; and reducers such as sodium, potassium and/or ammonium sulfite and/or bisulfite, sodium, potassium and/or zinc formaldehyde sulfoxylate, as well as ascorbic acid. Oxidizers can also be used by their selves, forming free radicals through thermal decomposition. In one aspect the initiator systems are redox initiator systems. The total amount of initiators relative to monomers used ranges from about 0.01 to 5 weight %. In one aspect the total amount of initiators ranges from about 0.1 to 3 weight %.

The resulting copolymer is not limited to any particular molecular weight. However, in one embodiment the copolymer has a molecular weight between 300 and 100,000. In another embodiment the copolymer has a molecular weight between 500 and 50,000. In even another embodiment the copolymer has a molecular weight between 1000 and 20,000.

As previously noted, the alcohol compatible, water-soluble copolymer can also be a scale inhibitor (e.g., for use in oil extraction and oil production). It can be used in a single umbilical line, or it can be added to a methanol umbilical line with or without a corrosion inhibitor. In one embodiment the concentration of copolymer in methanol, based on solid content, is about 0.01% to 40%. In another embodiment the concentration is between about 0.05% and 30%. In even another embodiment the concentration is between about 0.1% and 20%.

The alcohol compatible, water-soluble copolymer can be used for other applications, also, such as an additive in industrial water treatment applications, including cooling towers, boilers, reverse osmosis units, desalination, climate control, water separation and/or paper manufacture.

The invention is further illustrated by the following non-limiting Examples—

Example 1

Deionized water (340 g), mono-methyl maleate (60 g, 0.46 mol) and ammonium hydroxide (40 g of a 28% solution) were added to a glass reactor equipped with stirrer, reflux condenser and temperature control. The reactor contents were heated to 90° C. A monomer mixture of acrylic acid (219.3 g, 3.05 mol) and hydroxypropyl methacrylate (53.4 g, 0.37 mol) was fed into the reactor over a period of 5 hours. A redox initiating system of an aqueous solution of sodium formaldehyde sulfoxilate (14 g) and tert-butyl hydroperoxide (20.8 g of a 70% solution) was fed separately and concurrently over a period of 5 hours and 30 minutes. The resulting polymer solution had a solid content of 33.3% and pH of 3.5.

Example 2

Deionized water (340 g), mono-methyl maleate (50.4 g, 0.388 mol) and ammonium hydroxide (38 g of a 28% solution) were added to a glass reactor equipped with stirrer, reflux condenser and temperature control. The reactor contents were heated to 90° C. A monomer mixture of acrylic acid (248.5 g, 3.45 mol) and hydroxypropyl methacrylate (5.6 g, 0.039 mol) was fed into the reactor over a period of 5 hours. A redox initiating system of an aqueous solution of sodium formaldehyde sulfoxilate (14 g) and tert-butyl hydroperoxide (20.8 g of a 70% solution) was fed separately and concurrently over a period of 5 hours and 30 minutes. The resulting polymer solution had a solid content of 35.0% and pH of 2.9.

Example 3

Deionized water (340 g), mono-methyl maleate (5 g, 0.038 mol) and ammonium hydroxide (38 g of a 28% solution) were added to a glass reactor equipped with stirrer, reflux condenser and temperature control. The reactor contents were heated to 90° C. A monomer mixture of acrylic acid (248.5 g, 3.45 mol) and hydroxypropyl methacrylate (55.9 g, 0.388 mol) was fed into the reactor over a period of 5 hours. A redox initiating system of an aqueous solution of sodium formaldehyde sulfoxilate (14 g) and tert-butyl hydroperoxide (20.8 g of a 70% solution) was fed separately and concurrently over a period of 5 hours and 30 minutes. The resulting polymer solution had a solid content of 37.5% and pH of 3.7.

Example 4

Deionized water (340 g), di-methyl maleate (60.1 g, 0.42 mol) and propan-2-ol (100 g) were added to a glass reactor equipped with stirrer, reflux condenser and temperature control. The reactor contents were heated to 83° C. A monomer mixture of acrylic acid (220 g, 3.06 mol) and hydroxypropyl methacrylate (53.4 g, 0.37 mol) was fed into the reactor over a period of 3 hours. A redox initiating system of an aqueous solution of sodium formaldehyde sulfoxilate (14 g) and tert-butyl hydroperoxide (20.8 g of a 70% solution) was fed separately and concurrently over a period of 3 hours and 30 minutes. The propan-2-ol was distilled off at the end of polymerization. Ammonium hydroxide (30 g of a 28% solution) was added to adjust pH. The resulting polymer solution had a solid content of 42.0% and pH of 2.5.

Example 5

Deionized water (340 g), di-methyl maleate (33.3 g, 0.23 mol) and propan-2-ol (100 g) were added to a glass reactor equipped with stirrer, reflux condenser and temperature control. The reactor contents were heated to 83° C. A monomer mixture of acrylic acid (298.3 g, 4.14 mol) and hydroxypropyl methacrylate (33.3 g, 0.23 mol) was fed into the reactor over a period of 4 hours. A redox initiating system of an aqueous solution of sodium formaldehyde sulfoxilate (14 g) and tert-butyl hydroperoxide (20.8 g of a 70% solution) was fed separately and concurrently over a period of 4 hours and 30 minutes. The propan-2-ol was distilled off at the end of polymerization. Ammonium hydroxide (30 g of a 28% solution) was added to adjust pH. The resulting polymer solution had a solid content of 37.2% and pH of 3.5.

Example 6

Deionized water (350 g), di-methyl maleate (29 g, 0.20 mol) and propan-2-ol (100 g) were added to a glass reactor equipped with stirrer, reflux condenser and temperature control. The reactor contents were heated to 83° C. A monomer mixture of acrylic acid (250.8 g, 3.48 mol) and hydroxyethyl methacrylate (25.2 g, 0.19 mol) was fed into the reactor over a period of 4 hours. A redox initiating system of an aqueous solution of sodium formaldehyde sulfoxilate (14 g) and tert-butyl hydroperoxide (20.8 g of a 70% solution) was fed separately and concurrently over a period of 4 hours and 30 minutes. The propan-2-ol was distilled off at the end of polymerization. Ammonium hydroxide (30 g of a 28% solution) was added to adjust pH. The resulting polymer solution had a solid content of 38.1% and pH of 3.0.

Example 7

Deionized water (350 g), di-methyl maleate (29 g, 0.20 mol) and propan-2-ol (100 g) were added to a glass reactor equipped with stirrer, reflux condenser and temperature control. The reactor contents were heated to 83° C. A monomer mixture of acrylic acid (250.8 g, 3.48 mol) and hydroxypropyl acrylate (26.5 g, 0.20 mol) was fed into the reactor over a period of 4 hours. A redox initiating system of an aqueous solution of sodium formaldehyde sulfoxilate (14 g) and tert-butyl hydroperoxide (20.8 g of a 70% solution) was fed separately and concurrently over a period of 4 hours and 30 minutes. The propan-2-ol was distilled off at the end of polymerization. Ammonium hydroxide (30 g of a 28% solution) was added to adjust pH. The resulting polymer solution had a solid content of 40.1% and pH of 3.1.

Example 8

Deionized water (350 g), di-methyl maleate (29 g, 0.20 mol) and propan-2-ol (100 g) were added to a glass reactor equipped with stirrer, reflux condenser and temperature control. The reactor contents were heated to 83° C. A monomer mixture of acrylic acid (250.8 g, 3.48 mol) and hydroxyethyl acrylate (22.4 g, 0.19 mol) was fed into the reactor over a period of 4 hours. A redox initiating system of an aqueous solution of sodium formaldehyde sulfoxilate (14 g) and tert-butyl hydroperoxide (20.8 g of a 70% solution) was fed separately and concurrently over a period of 4 hours and 30 minutes. The propan-2-ol was distilled off at the end of polymerization. Ammonium hydroxide (30 g of a 28% solution) was added to adjust pH. The resulting polymer solution had a solid content of 37.3% and pH of 3.2.

Example 9

Deionized water (340 g), di-methyl maleate (14.5 g, 0.10 mol) and propan-2-ol (100 g) were added to a glass reactor equipped with stirrer, reflux condenser and temperature control. The reactor contents were heated to 83° C. A monomer mixture of acrylic acid (264.7 g, 3.68 mol) and hydroxypropyl methacrylate (14.0 g, 0.10 mol) was fed into the reactor over a period of 4 hours. A redox initiating system of an aqueous solution of sodium formaldehyde sulfoxilate (14 g) and tert-butyl hydroperoxide (20.8 g of a 70% solution) was fed separately and concurrently over a period of 4 hours and 30 minutes. The propan-2-ol was distilled off at the end of polymerization. Ammonium hydroxide (30 g of a 28% solution) was added to adjust pH. The resulting polymer solution had a solid content of 43.4% and pH of 2.9.

Example 10

Deionized water (350 g), mono-ethyl maleate (60 g, 0.42 mol) and ammonium hydroxide (46.7 g of a 28% solution) were added to a glass reactor equipped with stirrer, reflux condenser and temperature control. The reactor contents were heated to 90° C. A mixture of acrylic acid (219.3 g, 3.05 mol) and hydroxypropyl methacrylate (53.4 g, 0.37 mol) was fed into the reactor over a period of 5 hours. A redox initiating system of an aqueous solution of sodium formaldehyde sulfoxilate (14 g) and tert-butyl hydroperoxide (20.8 g of a 70% solution) was fed separately and concurrently over a period of 5 hours and 30 minutes. The resulting polymer solution had a solid content of 39.3% and pH of 2.8.

Example 11

Deionized water (350 g) and mono-methyl maleate (60 g, 0.462 mol) were added to a glass reactor equipped with stirrer, reflux condenser and temperature control. The reactor contents were heated to 90° C. A mixture of acrylic acid (219.3 g, 3.05 mol) and hydroxypropyl methacrylate (53.4 g, 0.37 mol) was fed into the reactor over a period of 5 hours. A redox initiating system of an aqueous solution of sodium formaldehyde sulfoxilate (14 g) and tert-butyl hydroperoxide (20.8 g of a 70% solution) was fed separately and concurrently over a period of 5 hours and 30 minutes. The resulting polymer solution had a solid content of 37.5% and pH of 1.8.

Comparative Example A

Without Hydrophilic Nonionic Monomer

Deionized water (340 g), mono-methyl maleate (60 g, 0.462 mol) and ammonium hydroxide (46.7 g of a 28% solution) were added to a glass reactor equipped with stirrer, reflux condenser and temperature control. The reactor contents were heated to 90° C. Acrylic acid (246 g, 3.42 mol) was fed into the reactor over a period of 5 hours. A redox initiating system of a aqueous solution of sodium formaldehyde sulfoxilate (14 g) and tert-butyl hydroperoxide (20.8 g of a 70% solution) was fed separately and concurrently over a period of 5 hours and 30 minutes. The resulting polymer solution had a solid content of 36.5% and pH of 3.4.

Comparative Example B

Use of Alkyl Ester of Monocarboxylic Acid Monomer Instead of Alkyl Ester of Dicarboxylic Acid Monomer Deionized water (200 g) and propan-2-ol (200 g) were heated to reflux in a glass reactor equipped with stirrer, reflux condenser and temperature control. A monomer mixture of acrylic acid (219.3 g, 3.05 mol), methyl methacrylate (46.2 g, 0.42 mol) and hydroxypropyl methacrylate (53.4 g, 0.37 mol) was fed into the reactor over a period of 5 hours. A redox initiating system of an aqueous solution of sodium formaldehyde sulfoxilate (14 g) and tert-butyl hydroperoxide (20.8 g of a 70% solution) was fed separately and concurrently over a period of 5 hours and 30 minutes. Propan-2-ol was removed by distillation. Ammonium hydroxide (40 g of a 28% solution) was added to adjust pH. The resulting polymer solution had a solid content of 45.2% and pH of 3.0.

Comparative Example C

Equivalent to Polymer E of Example 1 of U.S. Pat. No. 4,937,002 with the Exception that the Ammonia Neutralized Maleic Variant is Non-Esterified Deionized water (340 g), maleic anhydride (45 g, 0.46 mol) and ammonium hydroxide (35 g of a 28% solution) were added to a glass reactor equipped with stirrer, reflux condenser and means of temperature control. The reactor contents were heated to 90° C. A monomer mixture of acrylic acid (223.4 g, 3.1 mol) and hydroxypropyl methacrylate (55.9 g, 0.39 mol) was fed into the reactor over a period of 5 hours. A redox initiating system of an aqueous solution of sodium formaldehyde sulfoxilate (14 g) and tert-butyl hydroperoxide (20.8 g of a 70% solution) was fed separately and concurrently over a period of 5 hours and 30 minutes. The resulting polymer solution had a solid content of 42.8% and pH of 2.9.

Comparative Example D

Commercial Polyacrylic Acid Homopolymer Used in Scale Inhibitor

Deionized water (160 g) was added to a glass reactor equipped with stirrer, reflux condenser and temperature control and the reactor contents were heated to 90° C. Acrylic acid (391 g, 5.4 mol) was fed into the reactor over a period of 6 hours. An initiating system of an aqueous solutions of sodium persulfate (14.2 g) and sodium metabisulfite (212 g of a 41% solution) were fed separately and concurrently over a period of 6 hours and 30 minutes. Ammonium hydroxide (92 g of a 28% solution) was added to adjust pH. The resulting polymer solution had a solid content of 52.0% and pH of 2.5.

Comparative Example E

Commonly Used Inhibitor of Phosphonopolycarboxylic Acid (PPCA)

Deionized water (300 g) and sodium hypophosphite (30 g) were added to a glass reactor equipped with stirrer, reflux condenser and temperature control. The reactor contents were heated to 80° C. Acrylic acid (331 g, 4.6 mol) was fed into the reactor over a period of 3 hours. An initiating system of an aqueous solution of ammonium persulfate (8.5 g) was fed separately and concurrently over a period of 3 hours and 30 minutes. Ammonium hydroxide (30 g of a 28% solution) was added to adjust pH. The resulting polymer solution had a solid content of 43.7% and pH of 3.5.

Comparative Example F

Commonly Used Inhibitor

Deionized water (250 g), maleic anhydride (94.5 g, 0.96 mol) and ammonia (203 g of a 28% solution) were added to a glass reactor equipped with a stirrer, reflux condenser and temperature control. Acrylic acid (142 g, 2 mol) was fed into the reactor over a period of 4 hours. An initiating system of an aqueous solution of sodium persulfate (7.5 g) and hydrogen peroxide (58 g) was fed separately and concurrently over a period of 4 hours and 15 minutes. Ammonium hydroxide (35 g of a 28% solution) was added to adjust pH. The resulting polymer solution had a solid content of 29.0% and pH of 3.5.

Comparative Example G

Commonly Used Inhibitor

Deionized water (250 g) and propan-2-ol (80 g) were heated to reflux in a glass reactor equipped with stirrer, reflux condenser and temperature control. A monomer mixture of acrylic acid (221 g, 3.1 mol) and AMPS monomer 2411 (156 g 50%, $NH_4$ salt, 0.35 mol) was fed into the reactor over a period of 3 hours. An initiating system of an aqueous solution of ammonium persulfate (12 g) was fed separately and concurrently over a period of 3 hours and 15 minutes. Propan-2-ol was removed by distillation. Ammonium hydroxide (53 g of a 28% solution) was added to adjust pH. The resulting polymer solution had a solid content of 47.1% and pH of 3.5.

Comparative Example H

Equivalent to Polymer D of Example 1 of U.S. Pat. No. 4,937,002

Deionized water (635 g), mono-methyl maleate (112.5 g, 0.865 mol) and sodium hydroxide (60 g of a 50% solution) were added to a glass reactor equipped with stirrer, reflux condenser and temperature control. The reactor contents were heated to 90° C. Acrylic acid (450 g, 6.25 mol) was fed into the reactor over a period of 5 hours. A redox initiating system of an aqueous solution of sodium formaldehyde sulfoxilate (26.3 g) and tert-butyl hydroperoxide (39 g of a 70% solution) was fed separately and concurrently over a period of 5 hours and 30 minutes. The resulting polymer solution had a solid content of 35.3% and pH of 3.5.

Comparative Example I

Polymer A from Example 1 of U.S. Pat. No. 4,937,002 was synthesized according to the procedure of the '002 patent.

In the following Table the amounts of alkyl, hydrophilic and carboxylic acid groups, as well as the Ratio I and II of present invention Polymers 1 to 11 and comparative Polymers A to I are provided.

TABLE 2

Computation of molar percentage of the different groups in the above Examples

| Polymer | "A"[1] [mol-%] | "H"[2] [mol-%] | "C"[3] [mol-%] | Ratio I[4] | Ratio II[5] |
|---|---|---|---|---|---|
| 1 | 10.6 | 8.6 | 80.8 | 1.2 | 0.237 |
| 2 | 9.1 | 0.9 | 90.0 | 10.0 | 0.111 |
| 3 | 1.0 | 9.9 | 89.1 | 0.099 | 0.122 |
| 4 | 19.6 | 8.7 | 71.7 | 2.2 | 0.395 |
| 5 | 9.6 | 4.8 | 85.7 | 2.0 | 0.168 |
| 6 | 9.9 | 4.8 | 85.4 | 2.1 | 0.171 |
| 7 | 9.8 | 5.0 | 85.2 | 2.0 | 0.174 |
| 8 | 9.9 | 4.7 | 85.5 | 2.1 | 0.170 |
| 9 | 5.1 | 2.4 | 92.5 | 2.1 | 0.081 |
| 10 | 9.8 | 8.7 | 81.5 | 1.1 | 0.228 |
| 11 | 10.6 | 8.6 | 80.8 | 1.2 | 0.237 |
| A | 10.6 | 0.0 | 89.4 | N/A | 0.119 |
| B | 10.9[6] | 9.7 | 79.4 | 1.1 | 0.260 |
| C | 0.0 | 9.8 | 90.2 | 0.0 | 0.109 |
| D | 0.0 | 0.0 | 100.0 | N/A | 0.000 |
| E | 0.0 | 0.0 | 100.0 | N/A | 0.000 |
| F | 0.0 | 0.0 | 100.0 | N/A | 0.000 |
| G | 0.0 | 0.0 | 100.0 | N/A | 0.000 |
| H | 10.9 | 0.0 | 89.1 | N/A | 0.122 |
| I | 0.0 | 15.0 | 85.0 | N/A | 0.176 |

[1] sum of alkyl groups of esters of dicarboxylic acid monomers, in mol %
[2] sum of hydrophilic groups of non-ionic monomers, in mol %
[3] sum of carboxylic acid groups, in mol %
[4] Ratio I = $\frac{A}{H}$
[5] Ratio II = $\frac{A+H}{C}$
[6] In comparative Polymer B the alkyl groups are from the ester of a mono-carboxylic acid monomer (methyl methacrylate) and not from the ester of a dicarboxylic acid monomer pursuant to the present invention.

Example 12

Inhibition of $CaCO_3$

Polymers were evaluated for their ability to inhibit calcium carbonate under standard NACE conditions (TM 0374-95, calcium carbonate precipitation test) at 5 ppm active polymer. A polyacrylic acid homopolymer inhibits greater than 95% of potential scale under these conditions.

TABLE 3

Calcium carbonate inhibition of selected polymers

| Example | % inhibition at 5 ppm active polymer |
|---|---|
| 1 | 85 |
| 4 | 99 |
| 5 | 99 |
| 6 | 98 |
| 7 | 100 |
| 8 | 99 |

From the above results it is seen that optimization of the formulation of the alcohol compatible, water soluble copolymer can be easily achieved (Polymers 4 to 8) so that the copolymer performs in a manner equivalent to a polyacrylic acid homopolymer.

Example 13

Inhibition of $BaSO_4$

Polymer samples were evaluated for their ability to inhibit barium sulfate scale. Polymers were evaluated in a 50:50 Forties formation water/seawater mixture at 80° C. for 2 hours. Forties is a well known oil bearing reservoir in the North Sea that suffers from barium sulfate scale. 80% inhibition is considered passing.

Synthetic North Sea seawater was prepared by addition to 1 liter of demineralized water 24.074 g of NaCl, 1.570 g of $CaCl_2.2H_2O$, 11.436 g of $MgCl_2.6H_2O$, 0.877 g of KCl and 4.376 g of $Na_2SO_4$. The Forties formation water was prepared by addition of 74.167 g NaCl, 10.304 g $CaCl_2.2H_2O$, 4.213 g $MgCl_2.6H_2O$, 0.709 g KCl and 0.448 g $BaCl_2.2H_2O$ to 1 liter of demineralized water. Both waters are buffered to pH 6.1.

TABLE 4

Barium sulfate inhibition of selected copolymers

| | % Inhibition, PPM of active polymer | | | | |
|---|---|---|---|---|---|
| Polymer | 5 | 10 | 20 | 50 | 100 |
| 1 | 44 | 83 | 89 | 97 | 97 |
| 4 | 14 | 22 | 28 | 40 | 60 |
| 5 | 22 | 31 | 46 | 53 | 56 |
| 6 | 16 | 33 | 37 | 61 | 74 |
| 7 | 21 | 28 | 65 | 90 | 84 |
| 8 | 24 | 37 | 64 | 73 | 68 |

Example 13 demonstrates that different polymer compositions result in various levels of $BaSO_4$ inhibition. Polymer 1 gives excellent $BaSO_4$ inhibition while $CaCO_3$ inhibition is less optimized (Table 3). In contrast, Polymer 7 shows both good $BaSO_4$ and $CaCO_3$ inhibition.

Example 14

Alcohol Compatibility

Samples from Polymers 1-11 and comparative Polymers A-H were added in different concentrations to methanol. Samples were then refrigerated without stirring at 4° C. for 15 hrs to assess stability. Visual observation of haze or precipitate was considered a failure.

TABLE 5

Compatibility of various aqueous polymer solutions at various concentrations in methanol at 4° C.

| | Polymer solution concentration in methanol | | | |
|---|---|---|---|---|
| Polymer | 50% | 5% | 0.5% | 0.05% |
| 1 | Pass | Pass | Pass | Pass |
| 2 | Pass | Pass | Pass | Pass |
| 3 | Pass | Pass | Pass | Pass |
| 4 | Pass | Pass | Pass | Pass |
| 5 | Pass | Pass | Pass | Pass |
| 6 | Pass | Pass | Pass | Pass |
| 7 | Pass | Pass | Pass | Pass |
| 8 | Pass | Pass | Pass | Pass |
| 9 | Pass | Pass | Pass | Pass |
| 10 | Pass | Pass | Pass | Pass |
| 11 | Pass | Pass | Pass | Pass |
| A | Pass | Fail | — | — |
| B | Fail | — | — | — |
| C | Pass | Fail | — | — |
| D | Fail | — | — | — |
| E | Fail | — | — | — |
| F | Fail | — | — | — |
| G | Fail | — | — | — |
| H | Fail | — | — | — |
| I | Fail | — | — | — |

When a "Fail" was observed, no further measurements were made at lower concentrations. Table 5 demonstrates that polymers within the ranges of Ratio I and II exhibit alcohol compatibility even at very low concentrations (0.05%), whereas polymers outside those ranges (the comparative polymers) fail at the highest concentration, even when there is plenty of water present to aide in compatibility. In particular, the results for comparative Polymer B show that when the alkyl group arises from a monocarboxylic acid monomer (such as the methyl methacrylate used in forming Polymer B) instead of a dicarboxylic acid monomer, there is no alcohol compatibility.

Example 15

Biodegradability

Biodegradability was measured according to OECD 306 (exact conditions) for testing of chemical biodegradability in sea water.

TABLE 6

Biodegradability of polymer

| Example | Biodegradability measure |
|---|---|
| 1 | 22% |

A commercially available sodium polyacrylate (Narlex LD31, available from Alco Chemicals, Chattanooga, Tenn.) was likewise tested for biodegradability according to OECD 306 standards. Biodegradation after the 28-day test period on the polyacrylate gave a biodegradation of only 1.6%, versus the 22% biodegradation of the polymer according to the present invention.

Although the present invention has been described and illustrated in detail, it is to be understood that the same is by way of illustration and example only, and is not to be taken as a limitation. The spirit and scope of the present invention are to be limited only by the terms of any claims presented hereafter.

What is claimed is:

1. Water soluble copolymer composition comprising a water soluble copolymer comprising at least three distinct monomers, said at least three distinct monomers comprising:
   at least one olefinically unsaturated carboxylic acid first monomer,
   at least one olefinically unsaturated mono- or di-alkyl ester of a dicarboxylic acid second monomer, wherein the dicarboxylic acid second monomer is selected from the group consisting of maleic acid, itaconic acid and combinations thereof, and at least one olefinically unsaturated hydrophilic, non-ionic third monomer,
   wherein the copolymer has a first molar ratio, Ratio I, of from about 0.01:1 to 1000:1, $$\text{wherein Ratio } I = \frac{A}{H}$$

wherein A, in mole percent, is the sum of the moles of alkyl ester groups of the at least one second monomer divided by the total number of moles of the at least three distinct monomers in the copolymer; and H, in mole percent, is the sum of moles of the hydrophilic groups of the at least one third monomer divided by the total number of moles of the at least three distinct monomers in the copolymer, wherein the copolymer has a second molar ratio, Ratio II, of from about 0.001:1 to 100:1, $$\text{wherein Ratio } II = \frac{A+H}{C}$$

wherein A and H are described above; and C, in mole percent, is the sum of the moles of carboxylic acid groups of the copolymer divided by the total number of moles of the at least three distinct monomers in the copolymer, and wherein the copolymer is water soluble and alcohol compatible; and a corrosion inhibitor.

2. Water-soluble copolymer composition according to claim 1, wherein no haze or precipitate occurs at 4° C. for 15 hrs or more of a mixture of water-soluble copolymer as a 20 weight % aqueous copolymer solution in methanol at a water-soluble copolymer to methanol weight ratio of not more than about 25 to 100.

3. Water-soluble copolymer composition according to claim 1 wherein the at least one first monomer is at least one monocarboxylic acid monomer, at least one dicarboxylic acid monomer, at least one mono-ester of a dicarboxylic acid monomer, at least one di-ester of a dicarboxylic acid monomer, or combinations thereof.

4. Water-soluble copolymer composition according to claim 3 wherein the at least one first monomer is at least one monocarboxylic acid monomer and the monocarboxylic acid monomer is selected from the group consisting of acrylic acid, methacrylic acid and combinations thereof, and/or the at least one first monomer is at least one dicarboxylic acid monomer and the dicarboxylic acid monomer is selected from the group consisting of maleic acid, fumaric acid, itaconic acid and combinations thereof.

5. Water-soluble copolymer composition according to claim 1 wherein the alkyl group of the mono- or di-alkyl ester of the at least one second monomer is a $C_1$ to $C_{20}$ hydrocarbon, a polyalkoxy, a polyalkylene glycol group or combinations thereof.

6. Water-soluble copolymer composition according to claim 5 wherein the alkyl group of the mono- or di-alkyl ester of the at least one second monomer is selected from the group consisting of a $C_1$ to $C_4$ hydrocarbon group, the polyalkoxy group is selected from the group consisting of a polyethoxy group, a polypropoxy group, a block copolymer of polyethoxy and polypropoxy group and combinations thereof, and the polyalkylene glycol group is selected from the group consisting of a polyethylene glycol group, a polypropylene glycol group, a block copolymer of polyethylene glycol and polypropylene glycol group, and combinations thereof.

7. Water-soluble copolymer composition according to claim 1 wherein the di-alkyl ester of the dicarboxylic acid monomer is chosen from only one type of alkyl group of two or more different types of alkyl groups.

8. Water-soluble copolymer composition according to claim 1 wherein the at least one third monomer is selected from the group consisting of a vinyl and/or allyl alcohol, a vinyl and/or allyl amine, a (meth)acrylic acid alkyl ester, a mono- or di-alkyl ester of a dicarboxylic acid monomer, a N-(di)alkyl (meth)acrylamide, and combinations thereof, and wherein the alkyl group is a hydroxy and/or amine containing $C_1$ to $C_8$ alkyl group.

9. Water-soluble copolymer composition according to claim 8 wherein the at least one third monomer is a (meth) acrylic acid alkyl ester, and wherein the alkyl group is a hydroxy and/or amine containing $C_1$ to $C_4$ alkyl group.

10. Water-soluble copolymer composition according to claim 9 wherein the (meth)acrylic acid alkyl ester is hydroxyethyl and/or hydroxypropyl (meth)acrylate.

11. Water-soluble copolymer composition according to claim 1, wherein the at least one third monomer has a water solubility at 20° C. of 5 g per liter or more.

12. Water-soluble copolymer composition according to claim 1 further comprising copolymerizable monomers selected from the group consisting of sulfur, phosphorous, chlorine, nitrogen and/or silicon containing monomers, styrene and derivatives thereof, vinyl acetate, and combinations thereof.

13. Water-soluble copolymer composition according to claim 12, wherein the copolymerizable monomers are added from about 0.01 to 50 mol percent per 100 mol copolymerized monomers.

14. Water-soluble copolymer composition according to claim 1, wherein ratio is from about 0.05:1 to 500:1.

15. Water-soluble copolymer composition according to claim 1, wherein Ratio II is from about 0.01:1 to 10:1.

16. Water-soluble copolymer composition according to claim 1, wherein no haze or precipitate occurs for at least 15 hours at 4° C. in a mixture of water-soluble copolymer as a 20 weight % aqueous copolymer solution in methanol at a copolymer to methanol weight ratio of not more than 10 to 100.

17. Water-soluble copolymer composition according to claim 1, wherein the alcohol in which the water-soluble copolymer is compatible in is a $C_1$ to $C_6$ alcohol with one or more hydroxy groups.

18. Water-soluble copolymer composition according to claim 17 wherein the alcohol is chosen from methanol, ethanol, propanol, butanol, ethylene glycol, propylene glycol and/or glycerol.

19. Water-soluble copolymer composition according to claim 1, wherein the alcohol compatible, water-soluble copolymer is un-neutralized or at least partly neutralized, and the neutralizing agent is a nitrogen containing base.

20. Water-soluble copolymer composition according to claim 1, wherein the alcohol compatible, water-soluble copolymer is compatible with corrosion inhibitors.

21. Water-soluble copolymer composition according to claim 1, wherein the alcohol compatible, water-soluble copolymer has a biodegradability of 10% or more measured according to OECD standards.

22. Method of producing water-soluble copolymer composition according to claim 1, comprising copolymerizing the monomers by radical solution copolymerization at temperatures of about 20 to 120° C. in water and/or in a homogeneous water-organic solvent mixture.

23. Water-soluble copolymer composition according to claim 1 wherein the at least one first monomer is not an unsaturated mono ester of a dicarboxylic acid monomer.

24. Water-soluble copolymer composition according to claim 23, wherein the at least one first monomer is a mono-carboxylic acid monomer.

25. Water-soluble copolymer composition according to claim 1, wherein no haze or precipitate occurs at 4° C. for 15 hrs or more of a mixture of water-soluble copolymer as a 50 weight % aqueous copolymer solution in methanol at a water-soluble copolymer to methanol weight ratio of not more than about 25 to 100.

26. Water-soluble copolymer composition according to claim 1, wherein no haze or precipitate occurs at 4° C. for 15 hrs or more of a mixture of water-soluble copolymer as a 5 weight % aqueous copolymer solution in methanol at a water-soluble copolymer to methanol weight ratio of not more than about 25 to 100.

27. Water soluble copolymer composition comprising:
at least one olefinically unsaturated carboxylic acid first monomer selected from the group consisting of olefinically unsaturated mono- di or tri-carboxylic acid monomers,
at least one olefinically unsaturated mono- or di-alkyl ester of a dicarboxylic acid second monomer, wherein the dicarboxylic acid is selected from the group consisting of maleic acid, itaconic acid and combinations thereof and
at least one olefinically unsaturated hydrophilic, non-ionic third monomer, selected from the group consisting of vinyl and/or allyl alcohols, vinyl and/or allyl amines, methacrylic acid alkyl esters, N(di)alkyl (meth)acrylamides, hydroxy methyl (meth)_acrylate, hydroxy ethyl (meth)acrylate, hydroxypropyl (meth)acrylate, hydroxy butyl (meth)acrylate, glycidylmethacrylate and its hydrolyzed form, dialkyl aminomethyl (meth)acrylate, dialkyl aminoethyl (meth)acrylate and/or dialkylaminopropyl (meth)acrylamide with $C_1$ to $C_4$ alkyl groups, vinyl formamide, vinyl acetamide; polyethylene glycol esters of acrylic acid, methacrylic acid, inaleic acid and/or itaconic acid; alkyl ethylene glycol esters of acrylic acid, methacrylic acid, maleic acid and/or itaconic acid; vinyl pyrrolidone, vinyl imidazole, vinyl alcohol (hydrolyzed vinyl acetate), (meth)allyl alcohol, glycidyl allyl ether, propanediol allyl ether, allyl glycol ethers, hydroxyalkyl (meth) acrylamides, bis-hydroxyalkyl (meth)acrylamides, N-[3-(dimethyl amino)-propyl] meth)acrylamide, N-[3-(dimethyl amino)] (meth)acrylate, N-methylol (meth)acrylamide, and/or N-methylol allyl carbamate and combinations thereof, wherein the copolymer has a first molar ratio, Ratio I, of from about 0.01:1 to about 1000:1, $$\text{wherein Ratio } I = \frac{A}{H}$$

wherein A, in mole percent, is the sum of the moles of alkyl ester groups of the at least one second monomer divided by the total number of moles of the at least three distinct monomers in the copolymer, and H, in mole percent, is the sum of moles of the hydrophilic groups of the at least one third monomer divided by the total number of moles of the at least three distinct monomers in the copolymer,
wherein the copolymer has a second molar ratio, Ratio II, of from about 0.001:1 to 100:1,
wherein Ratio II=

$$\frac{\text{``}A + H\text{''}}{C}$$

wherein A and H are described above; and C, in mole percent, is the sum of the moles of carboxylic acid groups of the copolymer divided by the total number of moles of the at least three distinct monomers in the copolymer, and wherein the copolymer is water soluble and alcohol compatible; and
a corrosion inhibitor.

28. Water-soluble copolymer composition according to claim 1 wherein the copolymer has a degree of biodegradability of about 10% or more measured according to OECD standards.

29. Water soluble copolymer comprising a water soluble copolymer comprising at least three distinct monomers, said at least three distinct monomers comprising:
   at least one olefinically unsaturated carboxylic acid first monomer,
   at least one olefinically unsaturated di-alkyl ester of a dicarboxylic acid second monomer, and
   at least one olefinically unsaturated hydrophilic, non-ionic third monomer,
   wherein the copolymer has a first molar ratio, Ratio I, of from about 0.01:1 to 1000:1, wherein Ratio $I = \dfrac{A}{H}$ wherein A, in mole percent, is the sum of the moles of alkyl ester groups of the at least one second monomer divided by the total number of moles of the at least three distinct monomers in the copolymer; and H, in mole percent, is the sum of moles of the hydrophilic groups of the at least one third monomer divided by the total number of moles of the at least three distinct monomers in the copolymer,
   wherein the copolymer has a second molar ratio, Ratio II, of from about 0.001:1 to 100:1, wherein Ratio $II = \dfrac{A+H}{C}$ wherein A and H are described above; and C, in mole percent, is the sum of the moles of carboxylic acid groups of the copolymer divided by the total number of moles of the at least three distinct monomers in the copolymer, and
   wherein the copolymer is water soluble and alcohol compatible.

* * * * *